United States Patent
Sato et al.

(10) Patent No.: US 8,173,013 B2
(45) Date of Patent: May 8, 2012

(54) FUEL FILTER

(75) Inventors: Hiroji Sato, Tokyo (JP); Yasushi Ueki, Yokohama (JP); Kensuke Ogose, Sagamihara (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 0 days.

(21) Appl. No.: 12/737,374

(22) PCT Filed: Jul. 9, 2009

(86) PCT No.: PCT/JP2009/062554
§ 371 (c)(1),
(2), (4) Date: Mar. 25, 2011

(87) PCT Pub. No.: WO2010/005060
PCT Pub. Date: Jan. 14, 2010

(65) Prior Publication Data
US 2011/0180469 A1    Jul. 28, 2011

(30) Foreign Application Priority Data
Jul. 10, 2008  (JP) .................. 2008-179816

(51) Int. Cl.
*B01D 29/13*  (2006.01)
*B01D 29/15*  (2006.01)
*B01D 35/02*  (2006.01)
*F02M 37/22*  (2006.01)

(52) U.S. Cl. .................. 210/172.4; 210/416.4; 210/489; 210/483

(58) Field of Classification Search .............. None
See application file for complete search history.

(56) References Cited

U.S. PATENT DOCUMENTS

| | | | | |
|---|---|---|---|---|
| 1,394,011 A * | 10/1921 | Hills | .......... | 210/172.4 |
| 1,518,686 A * | 12/1924 | Bland | .......... | 210/172.2 |
| 1,568,796 A * | 1/1926 | Breer | .......... | 210/130 |
| 1,773,134 A * | 8/1930 | Fisher | .......... | 210/167.02 |
| 2,057,779 A * | 10/1936 | Jacobs | .......... | 210/172.3 |
| 2,261,915 A * | 11/1941 | Korte et al. | .......... | 417/423.3 |
| 2,711,828 A * | 6/1955 | Webb et al. | .......... | 210/489 |
| 2,767,736 A * | 10/1956 | Lackinger | .......... | 137/574 |
| 2,770,362 A * | 11/1956 | Paquin | .......... | 210/304 |
| 2,788,125 A * | 4/1957 | Webb | .......... | 210/172.4 |
| 2,810,482 A * | 10/1957 | Kasten | .......... | 210/460 |
| 2,877,903 A * | 3/1959 | Veres | .......... | 210/462 |
| 2,905,327 A * | 9/1959 | Phillips | .......... | 210/463 |
| 2,923,411 A * | 2/1960 | Oster | .......... | 210/172.4 |
| 2,933,188 A * | 4/1960 | Jacula | .......... | 210/172.3 |
| 2,937,755 A * | 5/1960 | Szwargulski | .......... | 210/172.3 |
| 3,020,950 A * | 2/1962 | Schraivogel | .......... | 137/549 |

(Continued)

FOREIGN PATENT DOCUMENTS
DE    199 56 368    6/2001
(Continued)

*Primary Examiner* — Robert James Popovics
(74) *Attorney, Agent, or Firm* — Manabu Kanesaka

(57) ABSTRACT

Disclosed is a fuel filter in which is disposed in a fuel suction port of a fuel tank or in a fuel line and used to filter the fuel. At least one of filter materials constituting the fuel filter is made into a multifunctional filter material having a function of trapping dust of different particle diameters in stages, by differing the diameter of the pores in the filter material from the primary side to the secondary side of the filter material so that the size of the pores decreases toward the secondary side.

1 Claim, 8 Drawing Sheets

U.S. PATENT DOCUMENTS

| | | | |
|---|---|---|---|
| 3,023,905 A * | 3/1962 | McDougal et al. | 210/172.4 |
| 3,061,104 A * | 10/1962 | Schaffner | 210/172.3 |
| 3,108,065 A * | 10/1963 | McMichael | 210/172.3 |
| 3,171,806 A * | 3/1965 | Schaffner | 210/172.4 |
| 3,295,297 A * | 1/1967 | Collins | 96/155 |
| 3,480,149 A * | 11/1969 | Houser | 210/445 |
| 3,731,805 A * | 5/1973 | Schniers | 210/86 |
| 3,826,372 A * | 7/1974 | Bell | 210/172.4 |
| 3,833,124 A * | 9/1974 | Sugiyama et al. | 210/460 |
| 3,875,059 A * | 4/1975 | Maschino | 210/172.3 |
| 3,900,397 A * | 8/1975 | Bell | 210/128 |
| 4,304,664 A * | 12/1981 | McAlindon et al. | 210/172.3 |
| 4,312,753 A * | 1/1982 | Bell | 210/250 |
| 4,420,396 A * | 12/1983 | Yamamoto et al. | 210/416.4 |
| 4,714,647 A | 12/1987 | Shipp, Jr. et al. | |
| 4,743,370 A * | 5/1988 | Mizusawa | 210/460 |
| 4,783,260 A * | 11/1988 | Kurihara | 210/232 |
| 4,828,694 A * | 5/1989 | Leason | 210/167.08 |
| 4,851,118 A * | 7/1989 | Kurihara | 210/315 |
| 4,874,510 A * | 10/1989 | Akira et al. | 210/172.4 |
| 4,966,522 A * | 10/1990 | Koyama | 415/121.2 |
| 5,049,267 A * | 9/1991 | Sasaki et al. | 210/172.3 |
| 5,049,271 A * | 9/1991 | Cain | 210/250 |
| 5,055,187 A * | 10/1991 | Ito et al. | 210/172.4 |
| 5,084,166 A * | 1/1992 | Shiraga et al. | 210/172.4 |
| 5,120,434 A * | 6/1992 | Yoshida | 210/172.4 |
| 5,169,531 A * | 12/1992 | Shiraga et al. | 210/460 |
| 5,186,152 A * | 2/1993 | Cortochiato et al. | 123/514 |
| 5,312,545 A * | 5/1994 | Starin et al. | 210/172.6 |
| 5,395,520 A * | 3/1995 | Ito et al. | 210/172.4 |
| 5,409,608 A * | 4/1995 | Yoshida et al. | 210/315 |
| 5,415,146 A * | 5/1995 | Tuckey | 123/509 |
| 5,494,575 A * | 2/1996 | Kitajima et al. | 210/167.04 |
| 5,538,633 A * | 7/1996 | Kitajima et al. | 210/445 |
| 5,547,568 A * | 8/1996 | Sasaki | 210/172.4 |
| 5,582,729 A * | 12/1996 | Shioda et al. | 210/461 |
| 5,607,578 A * | 3/1997 | Ohkouchi et al. | 210/172.4 |
| 5,639,367 A * | 6/1997 | Ohzeki et al. | 210/315 |
| 5,647,329 A * | 7/1997 | Bucci et al. | 123/509 |
| 5,665,229 A * | 9/1997 | Fitzpatrick et al. | 210/232 |
| 5,679,042 A | 10/1997 | Varona | |
| 5,702,237 A * | 12/1997 | Hill | 417/313 |
| 5,716,522 A * | 2/1998 | Chilton et al. | 210/317 |
| 5,728,292 A * | 3/1998 | Hashimoto et al. | 210/136 |
| 5,746,186 A * | 5/1998 | Kidokoro | 123/516 |
| 5,776,341 A * | 7/1998 | Barnard et al. | 210/306 |
| 5,795,468 A * | 8/1998 | Reising et al. | 210/172.4 |
| 5,902,480 A * | 5/1999 | Chilton et al. | 210/317 |
| 5,924,445 A * | 7/1999 | Ambrose et al. | 137/549 |
| 5,928,507 A * | 7/1999 | Chiga | 210/172.4 |
| 6,165,373 A * | 12/2000 | Agner | 210/767 |
| 6,169,045 B1 | 1/2001 | Pike et al. | |
| 6,220,454 B1 * | 4/2001 | Chilton | 210/483 |
| 6,241,883 B1 * | 6/2001 | Noda | 210/172.3 |
| 6,283,731 B1 * | 9/2001 | Yoshioka | 417/423.3 |
| 6,293,420 B1 * | 9/2001 | Richter et al. | 220/563 |
| 6,343,589 B1 * | 2/2002 | Talaski et al. | 123/514 |
| 6,451,205 B1 * | 9/2002 | McGaw, Jr. | 156/73.3 |
| 6,464,872 B1 * | 10/2002 | Honda | 210/416.4 |
| 6,471,072 B1 * | 10/2002 | Rickle et al. | 210/486 |
| 6,471,863 B2 * | 10/2002 | Kojima | 210/416.4 |
| 6,575,309 B1 * | 6/2003 | Chiga | 210/435 |
| 6,613,227 B2 * | 9/2003 | Rickle | 210/232 |
| 6,638,423 B2 * | 10/2003 | Dockery | 210/132 |
| 6,736,273 B2 * | 5/2004 | Chiga | 210/461 |
| 6,821,422 B1 * | 11/2004 | Brzozowski et al. | 210/416.4 |
| 6,830,687 B2 * | 12/2004 | Dockery et al. | 210/416.4 |
| 6,833,070 B2 * | 12/2004 | Fischer et al. | 210/232 |
| 6,874,643 B2 * | 4/2005 | Iwamoto | 210/461 |
| 6,936,168 B2 * | 8/2005 | Dockery et al. | 210/416.4 |
| 6,951,208 B2 * | 10/2005 | Milton | 123/509 |
| 6,953,527 B2 * | 10/2005 | Brower et al. | 210/295 |
| 6,964,265 B2 * | 11/2005 | Iwamoto | 123/510 |
| 6,998,043 B2 * | 2/2006 | Fischer et al. | 210/232 |
| 7,029,582 B2 * | 4/2006 | Sato et al. | 210/232 |
| 7,087,160 B2 * | 8/2006 | Beer et al. | 210/167.02 |
| 7,112,278 B2 * | 9/2006 | Yamada et al. | 210/332 |
| 7,128,218 B2 * | 10/2006 | Rosendahl et al. | 210/455 |
| 7,134,568 B2 * | 11/2006 | Moriyama et al. | 220/563 |
| 7,182,869 B2 * | 2/2007 | Catlin et al. | 210/416.4 |
| 7,329,339 B2 * | 2/2008 | Kimisawa et al. | 210/136 |
| 7,387,111 B2 * | 6/2008 | Yu et al. | 123/509 |
| 7,407,057 B2 * | 8/2008 | Vichinsky et al. | 210/437 |
| 7,429,322 B2 * | 9/2008 | Fujita et al. | 210/172.4 |
| 7,478,729 B2 * | 1/2009 | Sato et al. | 210/491 |
| 7,901,572 B2 * | 3/2011 | Sato | 210/172.4 |
| 7,927,400 B2 * | 4/2011 | Graber et al. | 95/59 |
| 7,964,096 B2 * | 6/2011 | Kimisawa et al. | 210/172.4 |
| 8,017,009 B2 * | 9/2011 | Arteche et al. | 210/323.1 |
| 8,029,667 B2 * | 10/2011 | Santinon | 210/172.6 |
| 8,038,877 B2 * | 10/2011 | Stausberg et al. | 210/167.08 |
| 8,052,868 B2 * | 11/2011 | Sato et al. | 210/172.4 |
| 8,080,086 B2 * | 12/2011 | Graber et al. | 95/59 |
| 2002/0023418 A1 * | 2/2002 | Kojima | 55/379 |
| 2002/0121473 A1 * | 9/2002 | Boast et al. | 210/450 |
| 2003/0010692 A1 * | 1/2003 | Sato et al. | 210/172 |
| 2003/0042185 A1 * | 3/2003 | Dockery | 210/132 |
| 2003/0057149 A1 * | 3/2003 | Iwamoto | 210/486 |
| 2003/0132156 A1 * | 7/2003 | Rickle | 210/416.4 |
| 2004/0007520 A1 * | 1/2004 | Rosendahl et al. | 210/435 |
| 2004/0144705 A1 * | 7/2004 | Yamada et al. | 210/172 |
| 2004/0159602 A1 * | 8/2004 | Brower et al. | 210/295 |
| 2004/0168971 A1 * | 9/2004 | Sato et al. | 210/486 |
| 2004/0222143 A1 * | 11/2004 | Kojima et al. | 210/416.4 |
| 2004/0251194 A1 * | 12/2004 | Brzozowski et al. | 210/416.4 |
| 2005/0006300 A1 * | 1/2005 | Sato et al. | 210/416.4 |
| 2005/0023201 A1 * | 2/2005 | Sato | 210/172 |
| 2005/0029173 A1 * | 2/2005 | Kimisawa et al. | 210/136 |
| 2005/0029180 A1 * | 2/2005 | Kimisawa et al. | 210/172 |
| 2005/0061723 A1 * | 3/2005 | Matsushita | 210/171 |
| 2005/0087178 A1 * | 4/2005 | Milton | 123/509 |
| 2005/0098489 A1 * | 5/2005 | Fischer et al. | 210/172 |
| 2005/0109685 A1 * | 5/2005 | Fujita et al. | 210/172 |
| 2005/0150826 A1 * | 7/2005 | Sato et al. | 210/488 |
| 2005/0286103 A1 * | 12/2005 | Yu et al. | 359/198 |
| 2006/0016741 A1 * | 1/2006 | Moriyama et al. | 210/172 |
| 2006/0076287 A1 * | 4/2006 | Catlin et al. | 210/416.4 |
| 2006/0180535 A1 * | 8/2006 | Yu et al. | 210/172 |
| 2006/0219620 A1 * | 10/2006 | Suga | 210/232 |
| 2006/0254974 A1 * | 11/2006 | Khalil et al. | 210/420 |
| 2006/0266693 A1 * | 11/2006 | Yoshida et al. | 210/335 |
| 2006/0266701 A1 * | 11/2006 | Dickerson et al. | 210/503 |
| 2007/0246420 A1 * | 10/2007 | Sato | 210/416.4 |
| 2008/0185331 A1 * | 8/2008 | Sato et al. | 210/435 |
| 2008/0290013 A1 * | 11/2008 | Stausberg et al. | 210/167.04 |
| 2009/0039011 A1 * | 2/2009 | Sato et al. | 210/491 |
| 2009/0050551 A1 * | 2/2009 | Kimisawa et al. | 210/172.4 |
| 2009/0120858 A1 * | 5/2009 | Kojima et al. | 210/167.08 |
| 2009/0139922 A1 * | 6/2009 | Poskie et al. | 210/167.08 |
| 2009/0301954 A1 * | 12/2009 | Beer et al. | 210/167.08 |
| 2009/0321347 A1 * | 12/2009 | Ogose | 210/452 |
| 2010/0038296 A1 * | 2/2010 | Beer et al. | 210/167.03 |
| 2010/0072120 A1 * | 3/2010 | Sato | 210/172.4 |
| 2010/0206802 A1 * | 8/2010 | Sato et al. | 210/490 |
| 2011/0036763 A1 * | 2/2011 | Santinon | 210/232 |
| 2011/0132825 A1 * | 6/2011 | Nishio | 210/172.4 |
| 2011/0155658 A1 * | 6/2011 | Graber et al. | 210/243 |
| 2011/0180469 A1 * | 7/2011 | Sato et al. | 210/172.4 |
| 2011/0192774 A1 * | 8/2011 | Ogose | 210/137 |
| 2011/0192786 A1 * | 8/2011 | Nagai et al. | 210/443 |

FOREIGN PATENT DOCUMENTS

| | | |
|---|---|---|
| JP | H03-175141 | 7/1991 |
| JP | H05-096110 | 4/1993 |
| JP | H06-142417 | 5/1994 |
| JP | H08-100371 | 4/1996 |
| JP | 2003-260321 | 9/2003 |
| JP | 2005-048721 | 2/2005 |
| WO | WO 02/43951 | 6/2002 |

* cited by examiner

FUEL FILTER

FIELD OF TECHNOLOGY

This invention relates to an improvement of a fuel filter used by being provided in a fuel suction port inside a fuel tank or in a fuel line.

BACKGROUND ART

The fuel inside the fuel tank is transferred to an internal combustion side through a suction pipe disposed inside the fuel tank and the like. In order to remove water from the fuel transferred in this manner and also prevent dust from being sent to a fuel pump, a filter device is attached to the fuel suction port and the like of such suction pipe. As such filter device, there is a filter device shown in Patent Document 1 disclosed by the present applicant.

The filter device of the Patent Document 1 includes a bag-like filter body allowing an internal space to communicate with the fuel suction port located inside the fuel tank. Such filter body includes two layers of a filter material made of a non-woven fabric formed by a melt-blown method between the filter material of the outermost layer made of a woven mesh and the filter material of the innermost layer made of a non-woven fabric formed by a spunbond method. Then, the average diameter of the pores of the non-woven fabric formed by the melt-blown method located on the inner side is made smaller than the average diameter of the pores of the non-woven fabric formed by the melt-blown method located on the outer side, and a filtration gradient (also called a filtration accuracy gradient and the like) is provided in the filter body. Thereby, while allowing fine dust to be trapped, by reducing the load on the filter material made of the non-woven fabric formed by the melt-blown method located on the inner side where the average diameter of the pores is small, a long-life filter device can be provided.

In the filter device constituted in this manner, the filtration gradient is made gentle by overlaying further more filter materials made of the non-woven fabric formed by the melt-blown method whose average diameter of the pores differs (the difference of the average diameter of the pores of adjacent filter materials is reduced). While improving filtration accuracy, a long-life filter device can be provided. However, given the manufacturing cost of the filter body, the overlaid number of the filter materials is limited. Also, the more the overlaid number of the filter materials, the number of the filter materials increases at a welded portion which is carried out in order to be bag-like, so that due to such welding, it is difficult to constitute the filter body appropriately.

PRIOR ART DOCUMENT

Patent Document

Patent Document 1: Japanese Patent Application Laid-Open Publication No. 2005-48721

SUMMARY OF THE INVENTION

Problems to be Solved by the Invention

A main problem which the present invention attempts to solve is to enable to easily and appropriately constitute such filter body while improving the filtration accuracy of the filter body constituting this kind of fuel filter and providing a long-life filter body as much as possible.

Means for Solving the Problems

In order to solve the above-mentioned problem, in the present invention, a fuel filter is provided in a fuel suction port inside a fuel tank or in a fuel line and used to filter the fuel. At least one of the filter materials constituting the fuel filter is made into a multifunctional filter material having a function of trapping dust of different particle diameters in stages, by differing the diameter of the pores in the filter material from a primary side to a secondary side of the filter material so that the size of the pores decreases toward the secondary side.

According to such fuel filter, by such single multifunctional filter material, dust of different particle diameters from coarse dust to fine dust can be respectively trapped at a different portion in a thickness direction of this multifunctional filter material. Also, in a state in which the clogging is hard to occur, the dust can be appropriately removed from the fuel to be absorbed. Specifically, relatively coarse dust can be trapped in the primary side of such multifunctional filter material, and relatively fine dust can be trapped in the secondary side. Additionally, the dust of the particle diameter sized between the above can be also trapped in the middle thereof.

Also, in such a case when a bag-like filter main body which becomes a main body of the fuel filter is formed by welding, which is provided linearly or in a belt shape on portions except a portion folded in two after multiple weldable sheet-like or mat-like filter materials are overlaid, or in such a case when the above-mentioned bag-like filter main body is formed by welding, which is provided in a circling shape on two pairs of the filter materials which are formed by overlaying the filter materials in this manner in a state such that respective sides which become inner sides of the filter main body face each other, such welding can be easily and appropriately carried out by minimizing the number of laminated layers of the filter materials of a welded portion.

Effect of the Invention

According to the present invention, without increasing the overlaid number of the filter materials due to the multifunctional filter material, an improvement of the filtration accuracy of the fuel filter and a long-life fuel filter can be attempted as much as possible. As a result, the fuel filter can be constituted easily and appropriately, and additionally at a low price.

BEST MODES OF CARRYING OUT THE INVENTION

Hereinafter, embodiments for implementing the present invention will be explained with reference to FIGS. 1 to 9(b).

Figure 1:
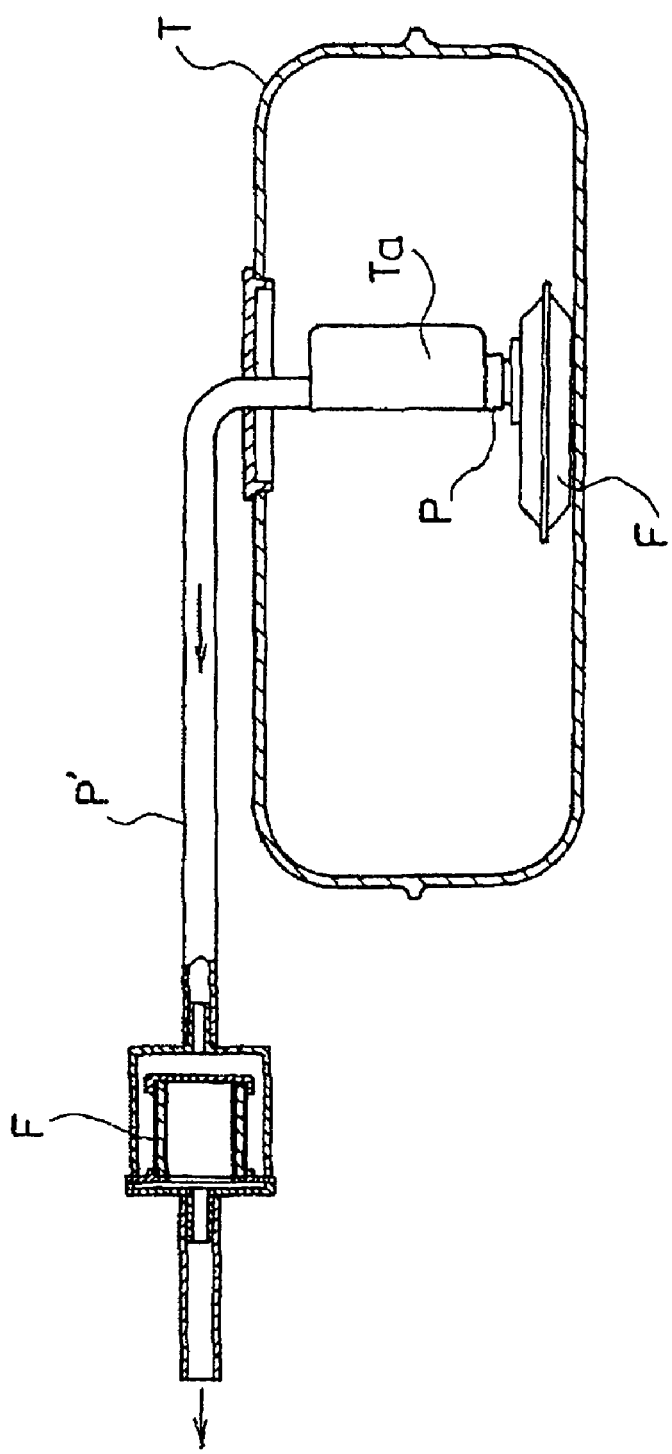
FIG. 1 is a structural view showing a usage portion of a fuel filter.
Figure 2:
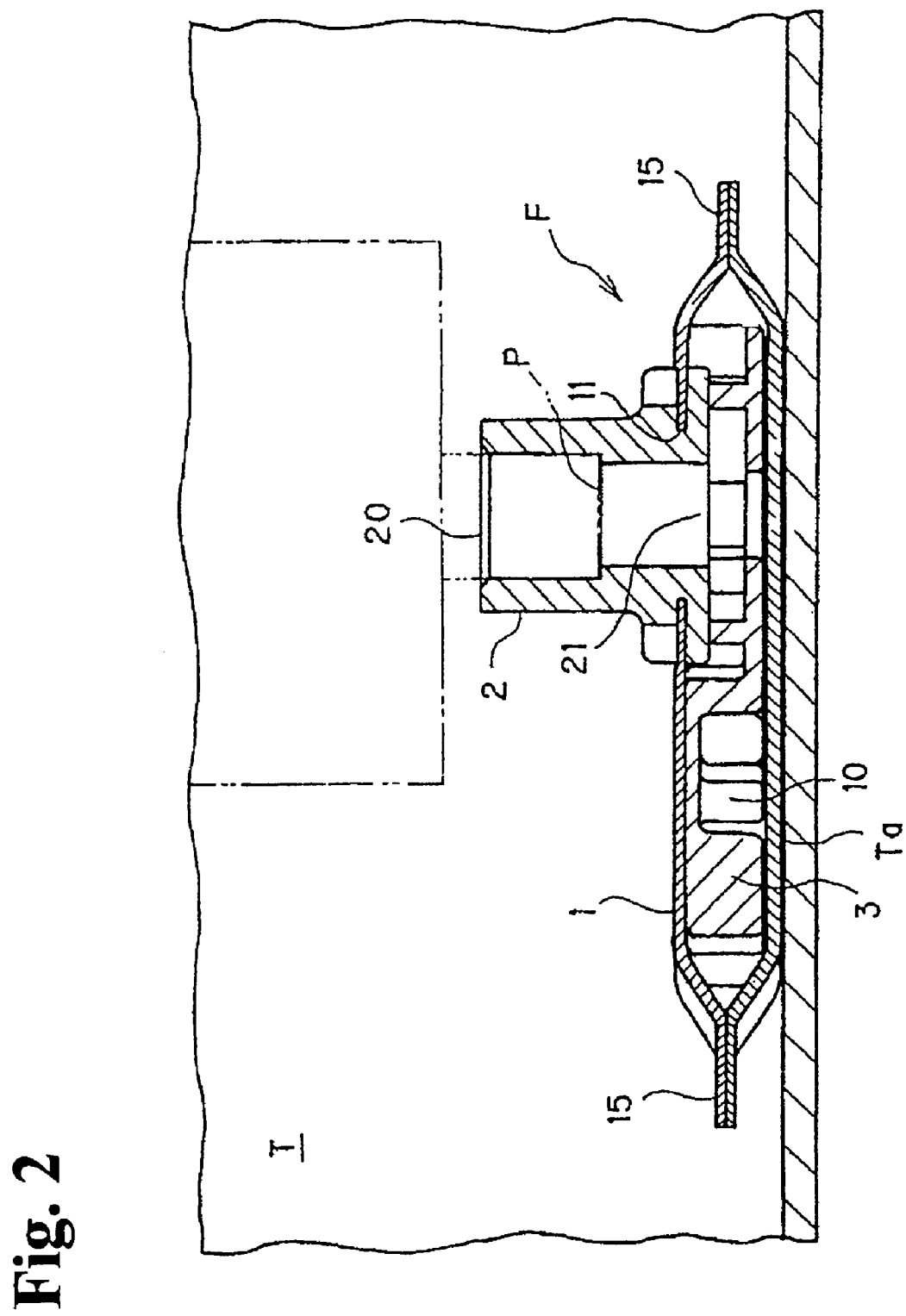
FIG. 2 is a cross sectional structural view showing a usage state of the same.
Figure 3:
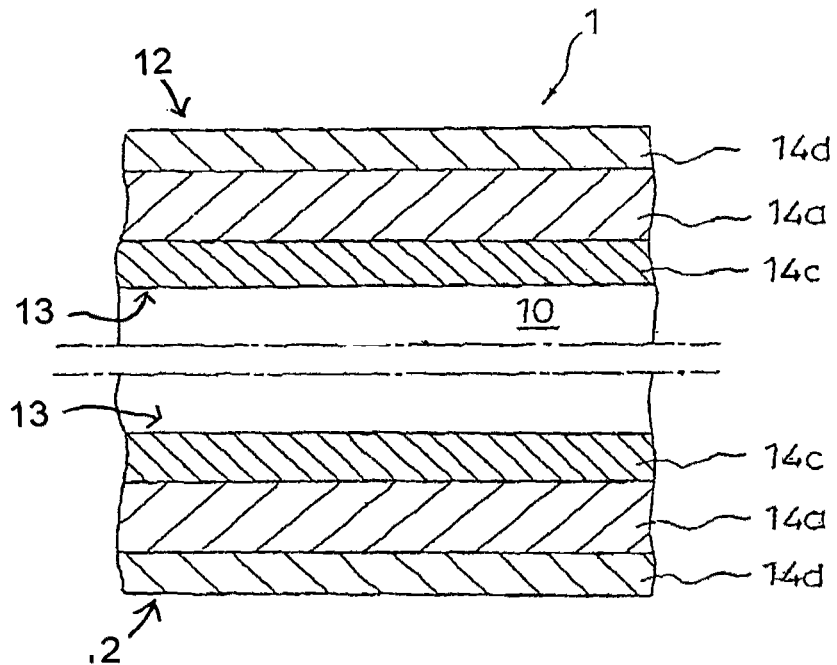
FIG. 3 is an enlarged cross sectional structural view showing one of structural examples of a filter main body.
Figure 4:
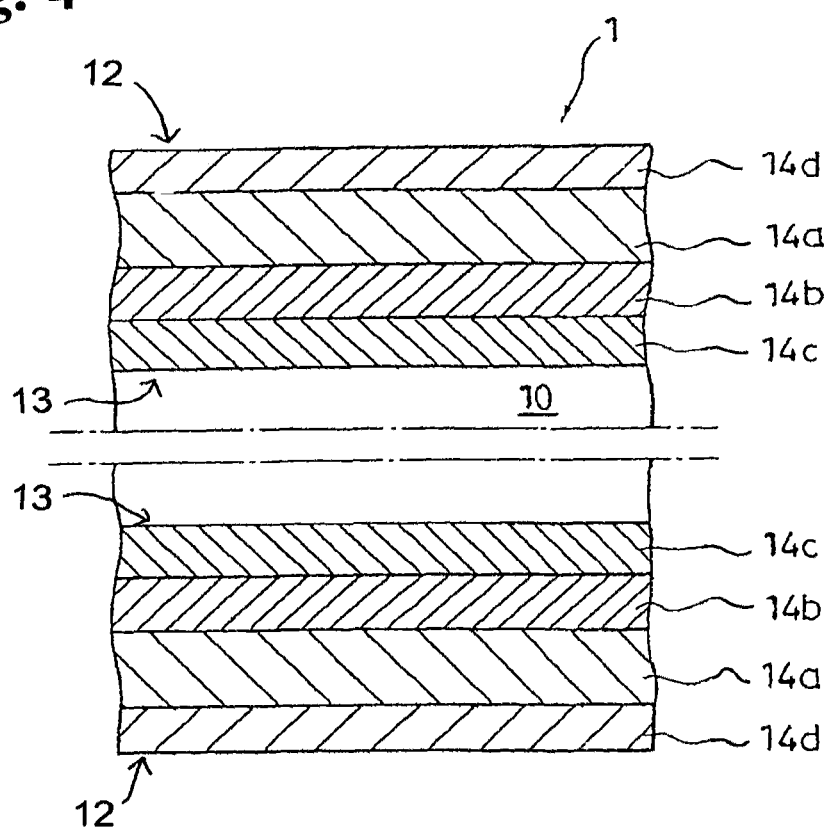
FIG. 4 is an enlarged cross sectional structural view showing another one of the structural examples of the filter main body.

Incidentally, here, FIG. 1 shows a pattern diagram of a fuel tank T and one portion of a fuel line P' so that a usage state of a fuel filter F constituted by applying the present invention can be easily understood. FIG. 2 is a structural view showing a state in which the fuel filter F is attached to a fuel suction port P located inside such fuel tank T. Also, FIG. 3 shows one example of a cross sectional structure of a filter main body 1 constituting such a filter device F. FIG. 4 shows another example of the cross sectional structure of the filter main body 1 structuring such filter device F. (FIGS. 3, 4 show only cross sectional structures of an upper surface side and a lower surface side of the filter main body 1, and the description of an interval formation member 3 housed inside the filter main body 1 is omitted.)

Also, FIGS. 5(a), 6(a), 7(a), 8(a), 9(a) show pattern diagrams so that a manufacturing process of a non-woven fabric which becomes a multifunctional filter material 14a constituting the fuel filter F according to the present invention can be easily understood. Also, FIGS. 5(b), 6(b), 7(b), 8(b), 9(b) show pattern diagrams of cross sectional structures of the non-woven fabric which is obtained through the respective manufacturing processes.

The fuel filter F according to the present embodiment is attached to the fuel suction port P located inside the fuel tank T of an automobile, a two-wheel automobile, or the like, or in the fuel line P' so as to prevent water or a foreign matter from entering into the fuel transferred to an internal combustion side.

Typically, such fuel filter F is used as a filter attached to the fuel suction port P of a suction pipe where the fuel suction port P is located inside the fuel tank T, i.e., a filter (called an in-tank type fuel filter, a suction filter, and the like), or as a filter disposed in the fuel line P' between the fuel tank T and an injector. (FIG. 1)

Also, transferring the fuel to the internal combustion side through, such fuel suction port P is carried out by a fuel pump disposed inside the fuel tank T or a fuel pump disposed outside the fuel tank T.

FIG. 2 shows a structural example as the above-mentioned suction filter. Such fuel filter F includes the filter main body 1 formed in a bag shape. Then, such fuel filter F is attached to the fuel suction port P so that an internal space 10 of this bag-shaped filter main body 1 is communicated with the above-mentioned fuel suction port P. Specifically, in the illustrated example, the above-mentioned fuel filter F includes a plastic tubular socket body 2 whose one end portion 20 is a connected end portion to the above-mentioned fuel suction port P and also whose other end portion 21 is a connected end portion to a communicating bore 11 formed in the above-mentioned filter main body 1. By this tubular socket body 2, the internal space 10 of the filter main body 1 is communicated with the fuel suction port P. Also, in this example, such fuel filter F includes the interval formation member 3 housed inside the above-mentioned filter main body 1 and always maintaining this filter main body 1 in an inflated bag shape. Specifically, in the illustrated example, the above-mentioned interval formation member 3 is constituted so as to have a thickness such that an upper surface thereof is contacted with an inner surface of an upper portion of the bag-shaped filter main body 1, and that a lower surface thereof is contacted with an inner surface of a lower portion of this filter main body 1. The interval formation member 3 is inserted into the inside of the filter main body 1, and always maintains this filter main body 1 in the inflated bag shape. In this interval formation member 3, multiple passage portions (not shown in the figures) for fuel ranged between the upper surface thereof and the lower surface thereof are formed. Also, such filter main body 1 is constituted by overlaying two or above filter materials. With that, at least one of the two or above filter materials is made into the multifunctional filter material 14a which is constituted such that the diameter of the pores differs from a primary side 12 to a secondary side 13 of this filter material and has a function of trapping dust of different particle diameters in stages. Here, in the present specification, the primary side 12 of the filter material is a side located on an outer side the filter main body 1 in this filter material, and represents an inflow side (upstream side) of the fuel to this filter material. Also, the secondary side 13 of the filter material is a side located on an inner side of the filter main body 1 in this filter material, and represents an outflow side (downstream side) of the fuel from this filter material.

Thereby, according to such fuel filter F, by such single multifunctional filter material 14a, dust of different particle diameters from coarse dust to fine dust can be respectively trapped at different portions in a thickness direction of this multifunctional filter material. Also, in a state wherein the clogging of the above-mentioned filter main body 1 in such fuel filter F is difficult, the dust can be appropriately removed from the fuel to be absorbed.

Also, in such a case when the bag-like filter main body 1 which becomes a main body of the fuel filter F is formed by the welding, which is provided linearly or in a belt shape on portions except a portion folded in two after multiple weldable sheet-like or mat-like filter materials are overlaid, and this folded portion, or in such a case when the above-mentioned bag-like filter main body is formed by the welding, which is provided in a circling shape on two pairs of the filter materials which are formed by overlaying the filter materials in this manner in a state such that sides which become the respective inner sides of the filter main body 1 face each other, such welding can be easily and appropriately carried out by minimizing the number of laminated layers of the filter materials of a welded portion.

Also, in such a case when the bag-like filter main body 1 is formed by the welding in such a way as to laminate two sheets or above of the filter materials which have a different average diameter of the pores of the above-mentioned filter materials, i.e., different average diameters of a passage bore of fine fuel in the filter materials, the number of the laminated layers of the filter materials becomes excessive at the welded portion thereof. As a result, integration of the above-mentioned members by the welding becomes difficult. In the filter device F according to the present embodiment, with an aspect wherein the above-mentioned welding and integration can be easily carried out by such single multifunctional filter material 14a, the filter main body 1 in which the clogging is difficult can be constituted. In the present embodiment, such multifunctional filter material 14a is constituted as the non-woven fabric, and the diameter of the pores in this multifunctional filter material 14a is gradually reduced as it goes toward the secondary side 13 of this multifunctional filter material 14a. Thereby, in the present embodiment, the dust is trapped at respective different positions such that relatively coarse dust is trapped in the primary side 12 of the multifunctional filter material 14a; relatively fine dust is trapped in the secondary side 13; and the dust of the particle diameter sized between the above is trapped in the middle of the primary side 12 and the secondary side 13.

In the present embodiment, such multifunctional filter material 14a is formed by using both or any one of manufacturing methods of a spunbond method and a melt-blown method which are a dry method of the formation of the non-woven fabric. The melt-blown method allows an ultrafine fiber to spin, and allows a dense layer trapping the fine dust in the multifunctional filter material 14a to be appropriately formed. In the spunbond method, compared to the melt-blown method, it is difficult to make the fiber to be formed extra fine. However, the spunbond method can easily enhance the intensity of the fiber to be formed. Also, the spunbond method is suitable for an efficient production of the non-woven fabric.

Figure 5A:
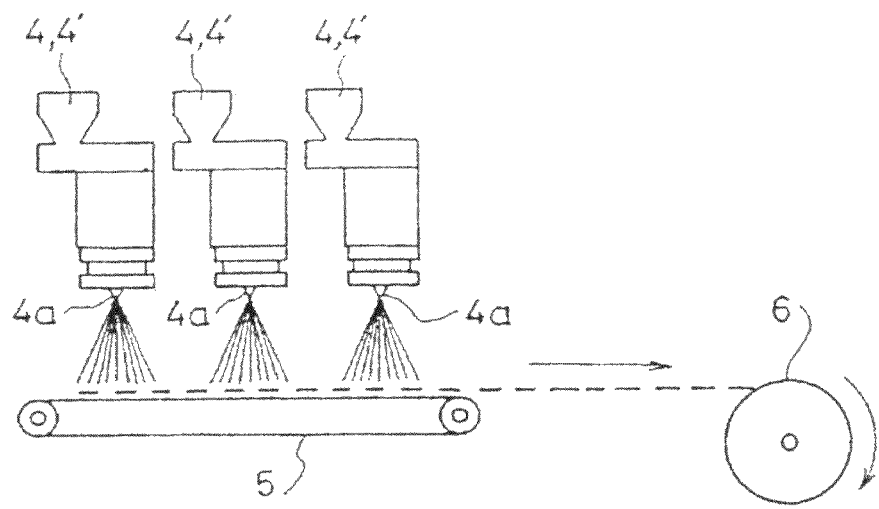
FIG. 5(a) is a structural view showing a manufacturing process (first example) of a non-woven fabric which becomes a multifunctional filter material.
Figure 5B:
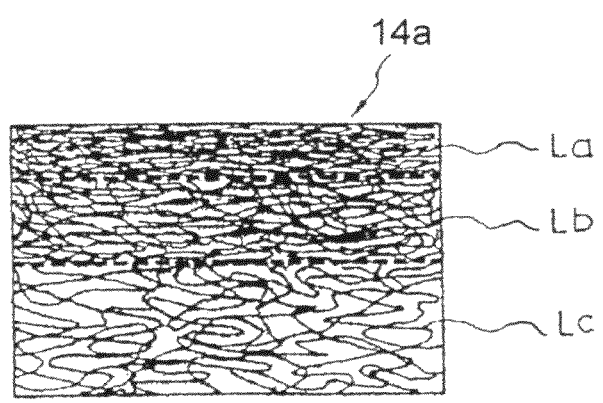
FIG. 5(b) is a cross sectional structural view of the multifunctional filter material formed through this manufacturing process.
Figure 6A:
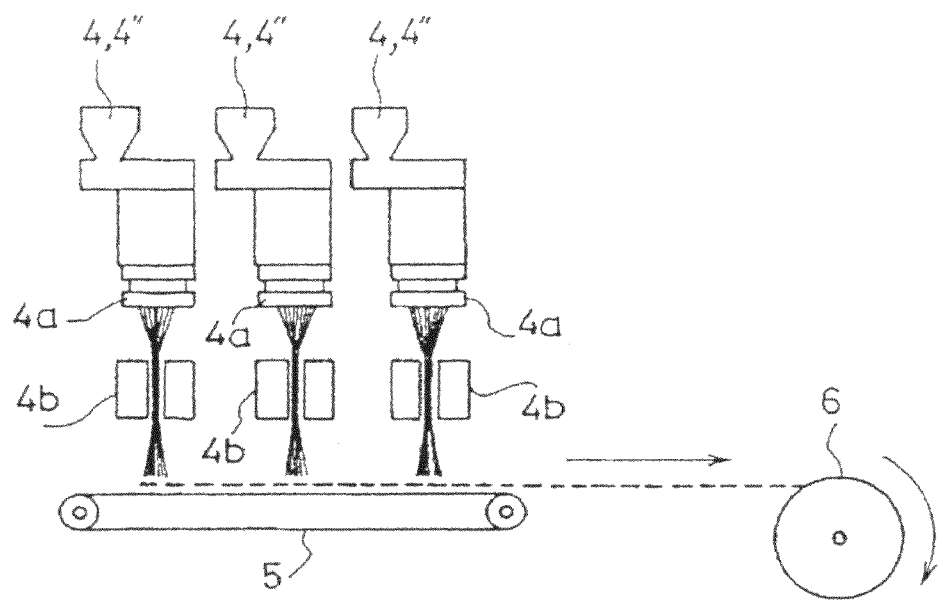
FIG. 6(a) is a structural view showing a manufacturing process (second example) of the non-woven fabric which becomes the multifunctional filter material.
Figure 6B:
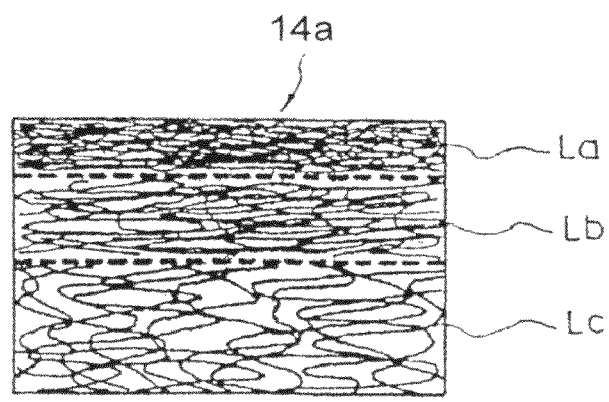
FIG. 6(b) is a cross sectional structural view of the multifunctional filter material formed through this manufacturing process.
Figure 7A:
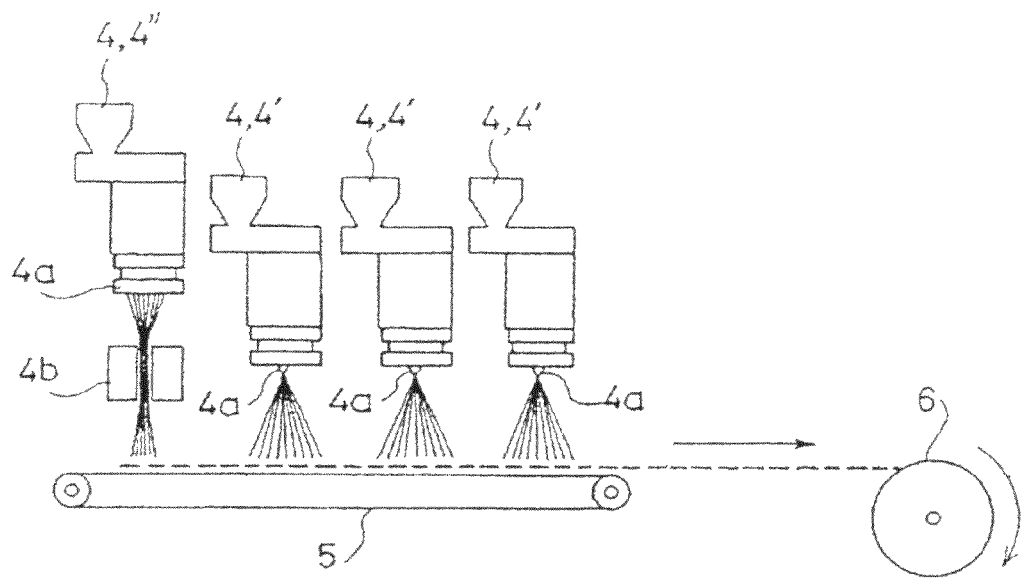
FIG. 7(a) is a structural view showing a manufacturing process (third example) of the non-woven fabric which becomes the multifunctional filter material.
Figure 7B:
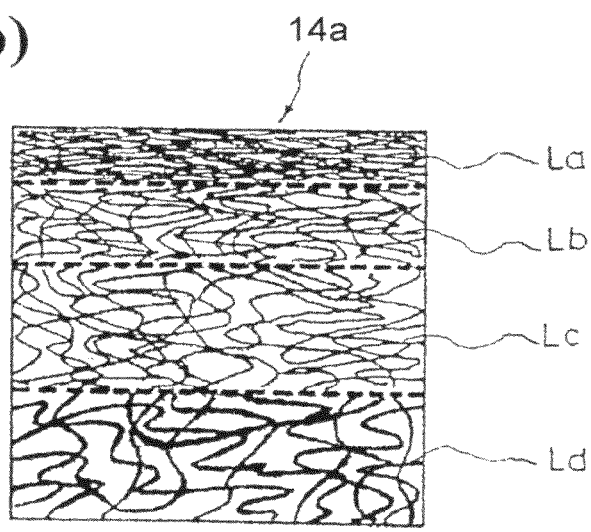
FIG. 7(b) is a cross sectional structural view of the multifunctional filter material formed through this manufacturing process.
Figure 8A:
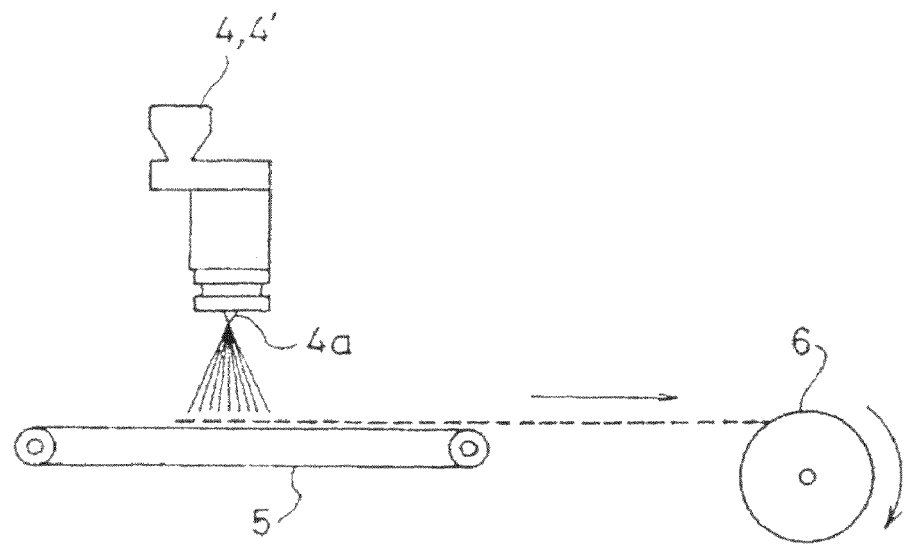
FIG. 8(a) is a structural view showing a manufacturing process (fourth example) of the non-woven fabric which becomes the multifunctional filter material.
Figure 8B:
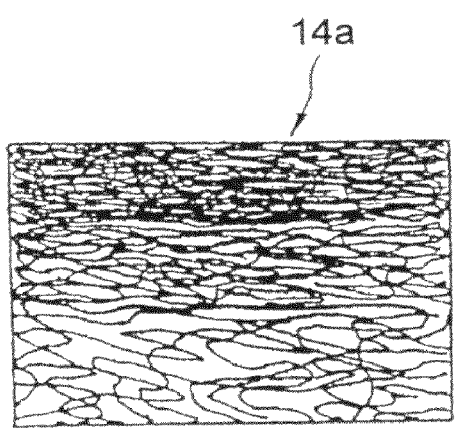
FIG. 8(b) is a cross sectional structural view of the multifunctional filter material formed through this manufacturing process.
Figure 9A:
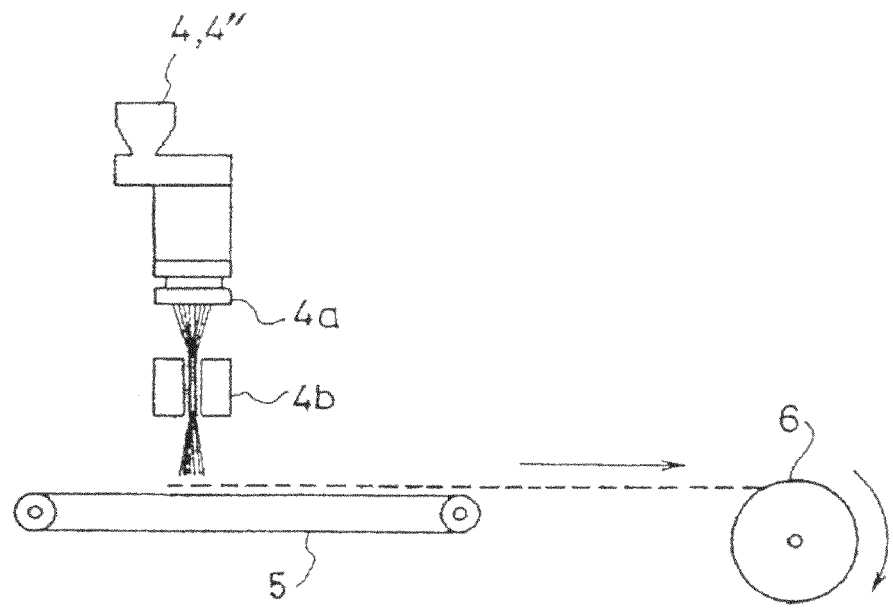
FIG. 9(a) is a structural view showing a manufacturing process (fifth example) of the non-woven fabric which becomes the multifunctional filter material.
Figure 9B:
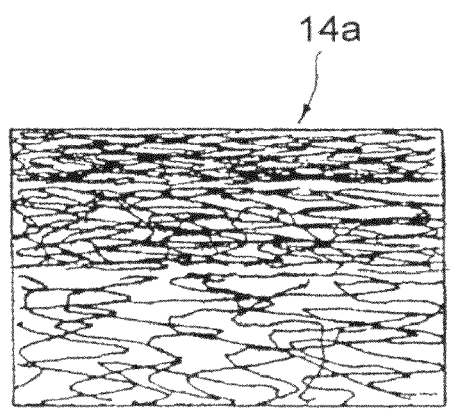
FIG. 9(b) is a cross sectional structural view of the multifunctional filter material formed through this manufacturing process.

FIGS. 5(a), 6(a), 7(a) show examples in which the multifunctional filter material 14a is constituted by forming layers L of two or above, whose diameters of the pores differ, i.e., whose average diameter of the pores of the passage bore of the fine fuel differs such that the following layer is formed by any of the above-mentioned manufacturing methods on the top of the layer formed beforehand by any of the above-mentioned manufacturing methods. In each figure, the reference numeral 4 represents non-woven fabric manufacturing devices; the reference numeral 5 represents a conveyor; the reference numeral 6 represents a winding device of the non-woven fabric which becomes the multifunctional filter material 14a conveyed by the conveyor 5; and the reference numeral 4b represents fiber stretching devices constituting non-woven fabric manufacturing devices 4" by the spunbond method.

Specifically, in FIG. 5(a), non-woven fabric manufacturing devices 4' by the melt-blown method are formed in multiple steps, and the width of the fiber formed by the respective non-woven fabric manufacturing devices 4' and a discharging amount from nozzles 4a are made differently. Also, with providing intervals in a conveying direction of the conveyor 5, the nozzle 4a of each non-woven fabric manufacturing device 4' is disposed on the top of this conveyor 5. Then, on the top of the above-mentioned layer formed on the top of the conveyor 5 by the nozzle 4a of the prior order located on a side just before the conveyance of this conveyor 5, the above-mentioned following layer is formed by the nozzle 4a of the following order, so that the non-woven fabric which becomes the multifunctional filter material 14a is formed. The non-woven fabric, which becomes the multifunctional filter material 14a formed in this manner, integrally comprises a dense layer La constituted by a thin fiber; a coarse layer Lc consti tuted by a wide fiber; and an intermediate layer Lb which is constituted by a fabric with a width of an intermediate between both the layers La and Lc and also whose coarseness and denseness are the intermediate of both the layers La and Lc. (FIG. 5(b)) In this case, even by making the discharging amount from the nozzles 4a different without changing the width of the fibers formed by the respective non-woven fabric manufacturing devices 4' which are formed in the multiple steps, the non-woven fabric which becomes the multifunctional filter material 14a can be formed so as to integrally comprise the dense layer La, the coarse layer Lc, and the intermediate layer Lb between both layers La and Lc, whose coarseness and denseness are the intermediate of both the layers La and Lc.

Also, in FIG. 6(a), the non-woven fabric manufacturing devices 4" by the spunbond method are formed in the multiple steps, and the width of the fiber formed by the respective non-woven fabric manufacturing devices 4" and the discharging amount from the nozzles 4a are made differently. Also, with providing the intervals in the conveying direction of the conveyor 5, the nozzle 4a of each non-woven fabric manufacturing device is disposed on the top of this conveyor 5. Then, on the top of the above-mentioned layer formed on the top of the conveyor 5 by the nozzle 4a of the prior order located on the side just before the conveyance of this conveyor 5, the above-mentioned following layer L is formed by the nozzle 4a of the following order, so that the non-woven fabric which becomes the multifunctional filter material 14a is formed. The non-woven fabric, which becomes the multifunctional filter material 14a formed in this manner, integrally comprises the dense layer La constituted by the thin fiber; the coarse layer Lc constituted by the wide fiber; and the intermediate layer Lb which is constituted by the fabric with the width of the intermediate between both the layers La and Lc and also whose coarseness and denseness are the intermediate of both the layers La and Lc. (FIG. 6(b)) Even in this case, even by making the discharging amount from the nozzles 4a different without changing the width of the fibers formed by the respective non-woven fabric manufacturing devices 4" which are formed in the multiple steps, the non-woven fabric which becomes the multifunctional filter material 14a can be formed so as to integrally comprise the dense layer La, the coarse layer Lc, and the intermediate layer Lb between both layers La and Lc, whose coarseness and denseness are the intermediate of both the layers La and Lc.

Also, in FIG. 7(a), the non-woven fabric manufacturing device 4" by the spunbond method is further combined with the non-woven fabric manufacturing devices 4' which are formed in the multiple steps by the melt-blown method as mentioned above. Also, with providing the intervals in the conveying direction of the conveyor 5, the nozzle 4a of each non-woven fabric manufacturing device 4 is disposed on the top of this conveyor 5. Then, on the top of the above-mentioned layer L formed on the top of the conveyor 5 by the nozzle 4a of the prior order located on the side just before the conveyance of this conveyor 5, the above-mentioned following layer L is formed by the nozzle 4a of the following order, so that the non-woven fabric which becomes the multifunctional filter material 14a is formed. In this example, by the non-woven fabric manufacturing device 4" by the spunbond method, the coarsest layer Ld comprising the widest fiber is formed in the first place. (FIG. 7(a)) The non-woven fabric, which becomes the multifunctional filter material 14a formed in this manner, integrally comprises the dense layer La constituted by the thin fiber; the coarse layer Lc constituted by the wide fiber; and the intermediate layer Lb which is constituted by the fabric with the width of the intermediate between both the layers La and Lc and also whose coarseness and denseness are the intermediate of both the layers La and Lc. Also, the non-woven fabric comprises the coarsest layer Ld by the above-mentioned spunbond method on the outside of this coarse layer Lc. (FIG. 7(*b*))

On the other hand, FIGS. 8(*a*) and 9(*a*) show examples in which the multifunctional filter material 14*a* is constituted by being formed by changing a spinning condition of the above-mentioned manufacturing method for a longitudinal time so that a cross-sectional area of a flow channel gradually changes in the thickness direction of this multifunctional filter material 14*a*. In each figure, the reference numeral 4 represents the non-woven fabric manufacturing device; the reference numeral 5 represents the conveyor; the reference numeral 6 represents the winding device of the non-woven fabric which becomes the multifunctional filter material 14*a* conveyed by the conveyor 5; and the reference numeral 4*b* represents the fiber stretching device constituting the non-woven fabric manufacturing device 4" by the spunbond method.

Specifically, in the examples shown in FIGS. 8(*a*) and 9(*a*), while changing the width of the fiber formed by the non-woven fabric manufacturing device 4' (4") by the melt-blown method or the spunbond method, and the discharging amount from the nozzle 4*a* for the longitudinal time, the non-woven fabric which becomes the multifunctional filter material 14*a* with a certain area is formed on the top of the conveyor 5. In a stage when the formation of such non-woven fabric with the certain area is completed, the conveyor 5 is run, and the following non-woven fabric with the certain area continuing to the non-woven fabric formed in this manner is formed in the same manner while changing the spinning condition for the longitudinal time. The non-woven fabric which becomes the multifunctional filter material 14*a* formed in this manner is structured so that the width of the fiber gradually becomes coarse, or gradually becomes dense while gradually changing the width of the fiber as it goes from one face side thereof toward the other face side. (FIGS. 8(*b*), 9(*b*)) Even in this case, even by changing the discharging amount from the nozzle 4*a* for the longitudinal time without changing the width of the fiber formed by the non-woven fabric manufacturing device 4' (4"), the non-woven fabric which becomes the multifunctional filter material 14*a* can be formed with a structure so as to gradually become coarse or gradually become dense while gradually changing the width of the fiber as it goes from one face side toward the other face side.

By making as above, the filter material of the non-woven fabric, i.e., the multifunctional filter material 14*a* with a smooth density gradient can be obtained at a relatively low price. Thereby, the fuel filter F with a high filtration accuracy in which the clogging is difficult can be provided at a low price.

More specifically, in the non-woven fabric constituting such multifunctional filter material 14*a*, in a case of integrally comprising the above-mentioned dense layer La, the intermediate layer Lb, and the coarse layer Lc, it is the most appropriate to constitute each layer La, Lb, and Lc as follows, from the aspect in which the filtration accuracy is improved, and the clogging of the multifunctional filter material 14*a* becomes difficult so as to provide a long-life non-woven fabric. Incidentally, the after-mentioned average diameter of the pores is measured by an automated pore diameter distribution measuring instrument, PERM POROMETER made by Porous Materials Inc. in the U.S.

| Dense layer La: | |
|---|---|
| Average diameter of the pores | 2 µm to 20 µm |
| Grammage | 5 g/m² to 40 g/m² |
| Fiber diameter | 0.4 µm to 5 µm |
| Intermediate layer Lb: | |
| Average diameter of the pores | 10 µm to 60 µm |
| Grammage | 10 g/m² to 100 g/m² |
| Fiber diameter | 1 µm to 20 µm |
| Coarse layer Lc: | |
| Average diameter of the pores | 20 µm to 100 µm |
| Grammage | 10 g/m² to 100 g/m² |
| Fiber diameter | 10 µm to 40 µm |

Also, the non-woven fabric constituting such multifunctional filter material 14*a* is most appropriately constituted by the following materials.

Polyolefin (chemical resistance is high, low price, and difficult to be hydrolyzed)

Polyester (chemical resistance and heat resistance are high)

Polyamide (chemical resistance and heat resistance are high)

Polyphenylenesulfide (chemical resistance and heat resistance are very high)

Polyacetal (chemical resistance is high)

Also, in the structural example of the filter main body 1 shown in FIG. 4, on the secondary side 13 of the multifunctional filter material 14*a*, filter materials 14*b*, which are formed by the melt-blown method and whose average diameter of the pores is made smaller than the average diameter of the pores of the multifunctional filter materials 14*a*, are overlaid.

Thereby, in the example shown in FIG. 4, by making the filter materials 14*b* of the non-woven fiber by the melt-blown method which can easily reduce the average diameter of the pores as main filters, and by making the above-mentioned multifunctional filter materials 14*a* as prefilters, a long-life filter device can be constituted in a state in which the load on the main filters is minimized.

Also, in the example shown in FIG. 4, the filter materials located on the innermost side of the filter main body 1 are filter materials 14*c* formed by the spunbond method.

In this case, by additionally providing rigidity on the filter main body 1 by the filter materials 14*c* formed by such spunbond method, the shape of the filter main body 1 can be easily retained. Also, herewith, without contacting the filter materials formed by the melt-blown method with the above-mentioned interval formation member 3, the filter materials 14*c* formed by the spunbond method with high rigidity can be contacted.

Also, in the example shown in FIG. 4, the filter materials located on the outermost side of the filter main body 1 are woven fabric meshes 14*d*. In this case, an inner wall surface Ta of a lower portion of this fuel tank T moves in and out due to a change of an inner pressure of the fuel tank T and the like. Accompanied by this (i.e., accompanied by the expansion and contraction and the like of the fuel tank T), even if friction occurs between a lower surface portion of the filter main body 1 and the inner wall surface Ta of the lower portion of this fuel tank T, the multifunctional filter materials 14*a* made by the non-woven fabric can be prevented from directly receiving an effect thereof.

Such woven fabric meshes 14*d* are typically constituted by weaving synthetic fabrics such as polyolefin, polyester, polyamide, polyphenylenesulfide, polyacetal, and the like so as to have sufficient mesh fineness for an oil-water separation. Such woven fabric meshes 14d can be constituted by, for example, folded weave, plain weave, diagonal weave, sateen weave, and the like.

Each filter material constituting the filter main body 1 can be also constituted by the same synthetic resin material. For example, each layer is constituted by polyolefin, polyester, polyamide, polyphenylenesulfide, or polyacetal.

In this case, the bag-like filter main body 1 can be constituted by mutually integrating each overlaid filter material in such a way as to be blended well by the welding.

Specifically, in the example shown in FIG. 4, the outermost layers of the filter main body 1 are the woven fabric meshes 14d, and the innermost layers are the filter materials 14c formed by the spunbond method. Also, the filter main body 1 is constituted by sandwiching the main filters and the prefilters in such a way that the prefilters (multifunctional filter material 14a) are located on woven fabric mesh 14d sides between the outermost layers and the innermost layers, and that the main filters (the filter materials 14b formed by the melt-blown method) are located on filter material 14c sides formed by the spunbond method between the outermost layers and the innermost layers. On the other hand, in the example shown in FIG. 3, the outermost layers of the filter main body 1 are the woven fabric meshes 14d, and the innermost layers are the filter materials 14c formed by the spunbond method. Also, the filter main body 1 is constituted in such a way that the multifunctional filter materials 14a are located between the outermost layers and the innermost layers.

The filter main body 1 according to the illustrated example can be constituted as follows. From a state wherein the filter materials are overlaid in the above-mentioned manner, the filter materials 14c formed by the spunbond method are located on the inner side, and the filter main body 1 is folded in two in a state wherein the above-mentioned interval formation member 3 is sandwiched. After this, ranging over a side portion except for a folded side portion, or along the side portion except for this folded side portion, heat seal portions (welding portions 15), integrating one side and the other side which are folded in two and overlaid on the inner side than this side portion, are formed. The communicating bore 11 to the above-mentioned tubular socket body 2 is pierced beforehand in four sheets of the filter materials overlaid in the above-mentioned manner before such folding in two is carried out.

Alternatively, the filter main body 1 according to the illustrated example can be constituted as follows. A first filter material pair which is constituted by overlaying three sheets (the aspect in FIG. 3) or four sheets (the aspect in FIG. 4) of the filter materials, and a second filter material pair which is constituted by overlaying the four sheets of the filter materials as mentioned above, are overlaid in a state wherein the filter materials 14c formed by the spunbond method of the first filter material pair, and the filter materials 14c formed by the spunbond method of the second filter material pair, are faced to each other, and the above-mentioned interval formation member 3 is sandwiched between the first filter material pair and the second filter material pair. After this, the heat seal portions, which allow the first filter material pair and the second filter material pair to be integrated, are formed in such a way as to circle an outline of the sandwiched interval formation member 3. The communicating bore 11 to the above-mentioned tubular socket body 2 is pierced beforehand in the first filter material pair or the second filter material pair.

In the filter main body 1 formed in this manner, additionally, spot welding may be appropriately provided in such a way that each filter material constituting the filter main body 1 is integrated at portions except for the above-mentioned heat seal portions prior to a formation thereof.

Also, the shape of the filter main body 1 is adjusted by cutting unnecessary portions located on the outer side from the above-mentioned heat seal portions 15 as necessary.

Incidentally, all contents of the specification, claims, drawings, and abstract of Japanese Patent Application No. 2008-179816 filed on Jul. 10, 2008 are cited in their entirety herein and are incorporated as a disclosure of the specification of the present invention.

What is claimed is:

1. A fuel filter for filtering fuel in a fuel tank comprising:
    a filter bag body having an opening, said body including:
        an outermost synthetic woven fabric mesh filtration layer constructed and arranged such that it does not permit water to pass through it and enter an interior space defined by the filter bag body;
        an air-laid nonwoven cloth multifunctional filtration layer adjacent to said outermost synthetic woven fabric mesh filtration layer, said multifunctional filtration layer having a porosity gradient wherein apertures or fuel passages contained therein gradually become smaller in cross-section across the depth of the multifunctional filtration layer in a direction as fuel flows toward the interior space, said multifunctional filtration layer including a dense layer composed of fibers having a diameter of 0.4-5 μm and having an average pore diameter of approximately 2-20 μm, an intermediate layer composed of fibers having a diameter of 1-20 μm and having an average pore diameter of approximately 10-60 μm and a coarse layer composed of fibers having a diameter of 10-40 μm and having an average pore diameter of approximately 20-100 μm;
        a melt-blown filtration material layer having an average aperture size that is smaller than an average aperture size of said multifunctional filtration layer which is adjacent thereto; and
        an innermost spun-bond filtration material layer adjacent said melt-blown filtration material layer and having sufficient rigidity such that it maintains a predetermined shape of the filter bag body, wherein each of the layers making up said filter bag body is connected by welds;
    a plastic cylindrical socket body constructed, at one end for connection to a fuel intake port and, at the other end has an end part for connection to said opening in said filter bag body, wherein said interior space is placed in fluid communication with said fuel intake port via a through hole extending between said ends of said plastic cylindrical socket body; and
    a space forming member within the interior space of said filter bag body.

* * * * *